(12) United States Patent
Goren et al.

(10) Patent No.: US 12,386,812 B1
(45) Date of Patent: Aug. 12, 2025

(54) LOST WRITE RESPONSES

(71) Applicant: VAST DATA LTD., Tel Aviv (IL)

(72) Inventors: Avi Goren, Tel Aviv (IL); Yogev Vaknin, Tel Aviv (IL); Ido Yellin, Tel Aviv (IL); Guy Keren, Tel Aviv (IL); Ilan Steinberg, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/490,730

(22) Filed: Oct. 19, 2023

(51) Int. Cl.
*G06F 16/23* (2019.01)

(52) U.S. Cl.
CPC ...... *G06F 16/2322* (2019.01); *G06F 16/2358* (2019.01)

(58) Field of Classification Search
CPC ............ G06F 16/2322; G06F 16/2358; G06F 11/0757
See application file for complete search history.

(56) References Cited

U.S. PATENT DOCUMENTS 6,141,759 A * 10/2000 Braddy ............... G06F 9/5044
713/168

* cited by examiner

*Primary Examiner* — William Spieler
(74) *Attorney, Agent, or Firm* — Reches Patents

(57) ABSTRACT

A method for managing lost content change requests (CCRs), the method includes (i) maintaining, by compute entities of a second storage system (SSS), states of executions of multiple CCRs of multiple categories and of multiple SSS reception times; (ii) receiving, from a first storage system (FSS), at a failure indication reception time (FIRT), a failure indication that is indicative of a certain category of the multiple categories. The certain category is associated with a failure of the FSS to receive a response, from the SSS, to a certain CCR of the certain category, that was presumably sent from the FSS to the SSS; (iii) determining, based on states of executions that are related at least to the certain category, when the SSS has completed to execute all CCRs of at least the certain category that were received by the SSS up to the FIRT; and (iv) transmitting, by the SSS, a SSS completion indication that indicates that the SSS has completed to execute all tasks that were received by the SSS up to the FIRT.

18 Claims, 4 Drawing Sheets

LOST WRITE RESPONSES

BACKGROUND

Distributed storage systems consist of multiple components that interact with each other via a communication network, for accessing content that is located at a remote component or even at another storage system. The storage system that requests access to the remote content may be a storage system that is directly connected to a user requesting access to the remote content, and this storage system is responsible for responding to the user within a determined time.

When remote components are involved in responding to an access request, there may be cases where the access requests or the corresponding responses are delayed or lost, and the requesting storage system does not receive the response within the determined time. Cases where requests or responses are lost may be upon failures of involved components (network components or compute nodes). Cases where responses are delayed beyond the determined time for responding may happen upon network congestion, overloaded queues, etc.

Timeouts are commonly used to handle unexpected failures in distributed storage systems. The request timeout specifies the time within which a response must be returned. If a response isn't returned within the time specified, the request ends and an error is returned.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
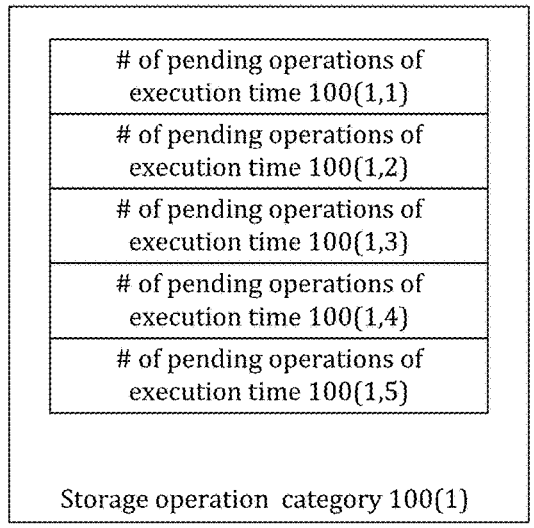
FIG. 1 is an example of a data structure for monitoring timing of pending operations.
Figure 1:
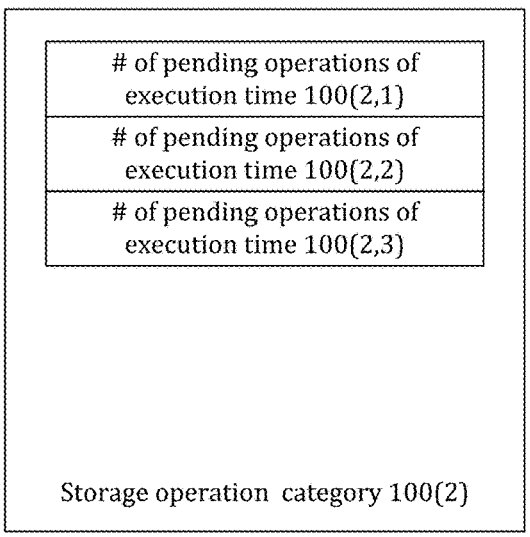
Figure 1:
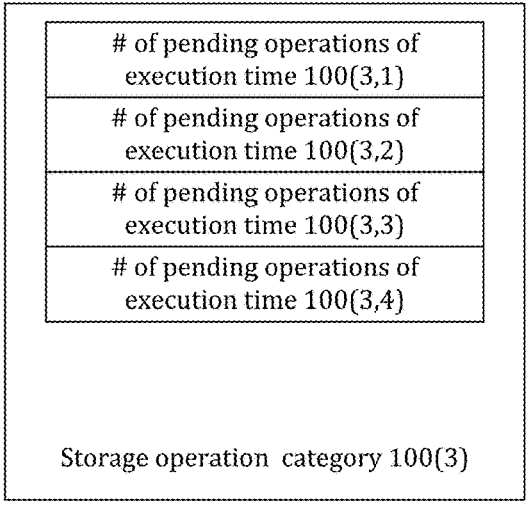

Multiple storage systems may store content that can be accessed by a client that is coupled to one of the storage systems, hereinafter, a first storage system. When the first storage system receives an access request that is addressed to content that is stored on a second storage system, the first storage system forwards the access request towards the second storage system and waits for a response, to be handed back to the client.

Non-responded access requests (particularly access requests that involve content update), experienced by the first storage system that sent the access request to the second storage system, may cause problems if retried or ignored by the first storage system, since it is not known whether the non-responded update will be eventually performed by the second storage system. Retrying or returning an error message, that will cause the client to retry, may lead to problems if the non-responded access request is eventually performed. Such problems may happen, for example, when the operation performed in response to the access request is not idempotent, or due to mixed sequence of requests towards the same storage entity.

A non-responded request may occur in various scenarios. A first case-when a timeout is triggered in response to sending an update request, due to various bottlenecks along the path, from the first storage system, via the network, and up to the storage devices of the second storage system. Other cases may occur upon a failure of an entity related to the initiation of the access request, for example when a compute entity that sent the access request failed, and the compute entity that took over the responsibilities of the failed compute entity (or even the same failed compute entity after being recovered) cannot determine whether the failed compute entity did not receive the response, received the response but did not handled the response (e.g., sent an acknowledge to the user), or handled the response but did not update statuses, etc. Another case of failure of another entity related to the initiation of the access request may be upon a re-initiation of a connection between a client and the storage system (that needed to be forced due to a connection problem), when the status of messages that were supposed to be transferred prior to the re-initiation—is not known. It is noted that the non-responded request may be eventually responded, but delayed beyond the expected time frame.

The system and methods described herein handle a case where the non-responded request may be queued, and the corresponding storage operation will be eventually executed. The handling includes suspending subsequent accesses (that follow the non-responded request) from being performed, until it is determined that a response to the non-responded request is not expected to be received after the time of determination, i.e., either a respond was received before the time of determination or will never be received.

Each storage system described herein implements an execution clock that is incremented as time passes, wherein each storage operation is stamped with an execution start time, upon being ingested into the execution queues, indicating the time obtained from the execution clock when the operation was initiated. The association of the storage operation with the execution start time is maintained while the storage operation is pending or being executed, and until the storage operation is completed. The storage operation refers to the process being handled in response to an access request. The access requests and the corresponding storage operations refer mainly to content updates, e.g., write data, file rename, file creation, file deletion, etc.

Each compute entity in the storage system keeps track of the oldest execution start time among execution start times of non-completed storage operations, i.e., the time of the oldest operation that is not yet completed. This way, it can be determined whether operations that were initiated up to a given point in time were completed or not. The storage system is able to monitor when all the compute entities of the storage system finished performing operations that started up to the given point in time.

Each compute entity may manage counters for counting the number of non-completed storage operations per any applicable value of the execution time. There may be different sets of counters, a set for each category of storage operation. A storage operation category may be, for example: a type of storage operation (read, write, file rename, file creation, etc.), initiator (e.g., client, group of clients, IP connection through which a storage operation was requested, a remote storage system that requested the storage operation from the storage system, all remote requests, all local requests, etc.), certain storage spaces of the storage system towards which the requests are addressed, etc. A storage operation category may be any combination of the above, e.g., write requests associated with a certain remote storage system.

When a compute entity queues an access request (or a storage operation to be executed in response to the access request), it reads the current value of the execution clock. The execution clock is accessible to all the compute entities of the storage system. It then stamps the storage operation with the execution time, and increments a counter related to the combination of the category of the requested storage operation and the execution time. When the operation is completed, the execution time that stamps the operation is used for accessing the corresponding counter, so as to decrease the counter. When a counter reaches zero—it means that there are no more storage operations of the corresponding storage operation category that started at the corresponding time.

FIG. 1 illustrates counters managed by one of the compute entities of the storage system, for each category of storage operation and each execution time that is associated with pending storage operations. FIG. 1 illustrates a counter set per each storage operation category 100(1)-100(3).

Pending storage operations are storage operations being ingested, i.e., queued or being executed, but not yet completed. The pending storage operations are associated with storage operation categories and with execution start times. The number of the pending storage operations related to storage operation category 100(1) and a first value of the execution time is represented by a counter 100(1,1). The number of the pending storage operations related to storage operation category 100(1) and a second value of the execution time is represented by a counter 100(1,2), the number of the pending storage operations related to storage operation category 100(2) and a third value of the execution time is represented by a counter 100(2,3), the number of the pending storage operations related to storage operation category 100(3) and a second value of the execution time is represented by a counter 100(3,2), and so on.

Although FIG. 1 illustrates separate sets for different storage categories, one data structure can be employed for all the counters. For example, the counters maybe implemented as a key-value store, where the key is a combination of the storage operation category and an execution time, and the value obtained in response to looking up the category and time combination, is the number of pending storage operations.

Figure 2:
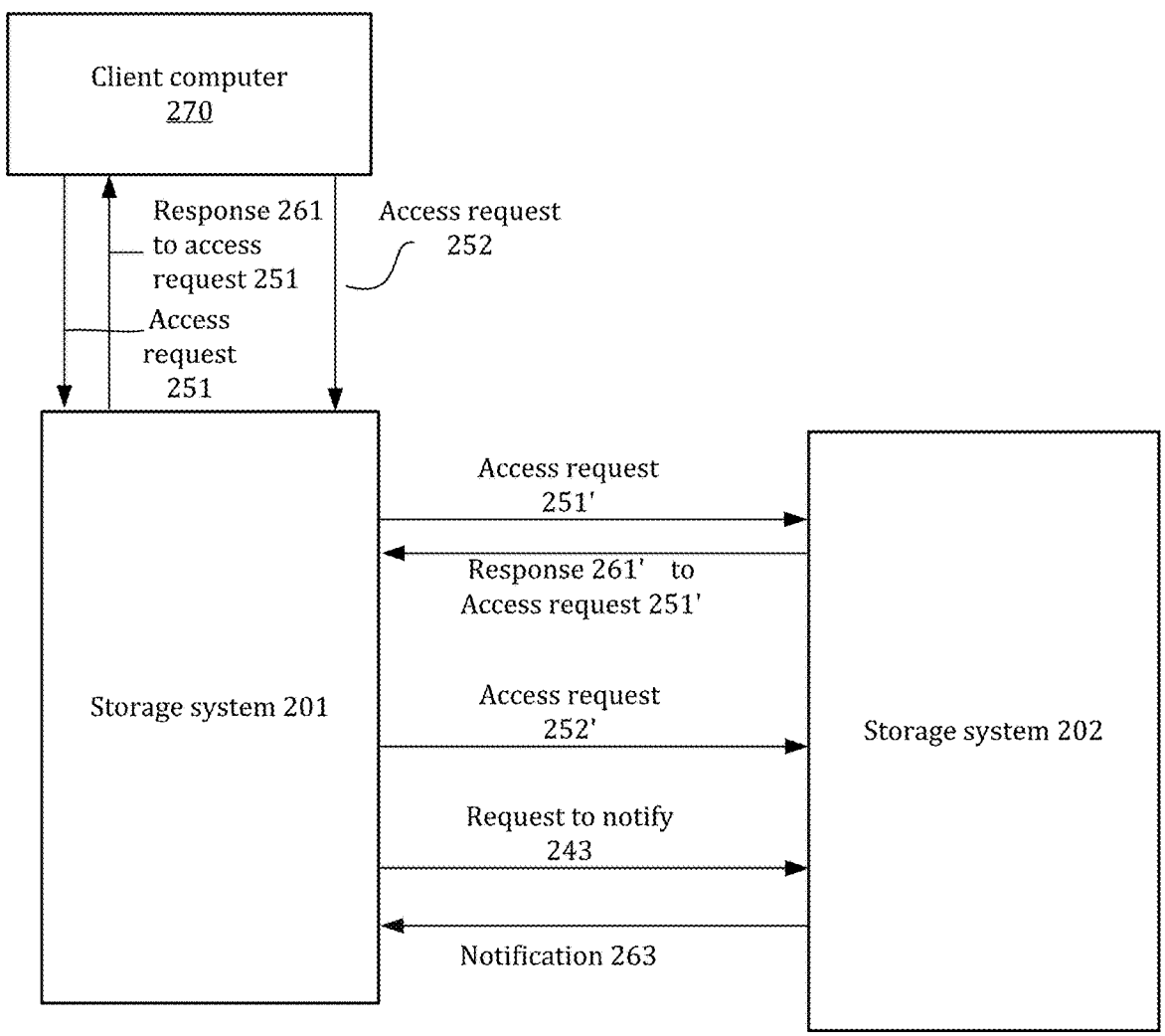
FIG. 2 is an example of a message flow between storage systems and a client.

A first storage system 201 of FIG. 2 receives an access request 251 from a client computer 270 that is connected to the first storage system. The access request is addressed to content (e.g., data, file, directory) that is stored at a second (remote) storage system 202, therefore, the first storage system sends the access request 251' to the second storage system. Access request 251' may have the same format or different format comparing to access request 251, and may be sent using the same or different protocol comparing to access request 251. When a response 261' to access request 251' is received from second storage system 202, first storage system 201 sends the response 261 (using the same or different format and/or protocol) to client computer 270.

Suppose the first storage system did not receive, within a pre-defined period, a response to an access request from the second storage system, e.g., no response is received for access request 252' that is sent in response to a user's access request 252. This may occur due to a time-out triggered while waiting for the response, or due to a failure of one of the compute entities of the first storage system, or due to a failure of a connection with the client, wherein the exact status of the response to access request 252 is not known. In any of these cases, the first storage system performs the following:

(i) halts execution of storage operations having characteristics similar to those of the non-responded access request. The characteristics of halted storage operations may include: requests towards the second storage system, requests received from the same client 270 that sent the non-responded request, the same type of access as the non-responded request (e.g., write, rename), combination or part of all of these characteristics.

(ii) sends a message, request to notify 243, to the second storage system, requesting to receive a notification from the second storage system, when all the storage operations currently pending and characterized by certain parameters—are completed. The request to notify may include characteristics of the pending storage operations of interest, e.g., the client identification (that sent the non-responded request), the type of access (e.g., write, rename, all). The notification, when received, will indicate that no response is expected for the non-responded access request, starting from the time of the notification.

(iii) when notification 263 is received—the first storage system resumes execution of storage operations that were halted.

It is noted that a response to the non-responded access request may be received by the first storage system, while waiting for the notification from the second storage system. But no response to that access request can be received after the reception of the notification. Therefore, after receiving the notification, the normal handling of access requests, including access requests of the same type (e.g., write requests), from the same client and addressed to the same storage entity (e.g., same file, same storage location)—can be proceeded.

When the second storage system receives the request to receive the notification about completion of pending storage operations, it performs the following steps:

(i) Selecting the storage operation category that matches the characteristics of the request to notify. The resolution of the storage categories supported by the second storage system may be different from the requested characteristics, therefore the closest matched category that covers all the conditions imposed by the characteristics—is selected. For example, if the characteristics defines writes from a specific client, and the second storage system manages only a category of writes from any client of the first storage system, then—the selected category will be—all writes from the first storage system.

(ii) Reading the current value of the execution clock to obtain a border execution time. The border execution time serves as the border between storage operations that are relevant to the request to notify and newer storage operations that are not relevant.

(iii) The second storage system needs to make sure that all the storage operations started before the border execution time are completed, before sending the notification. Therefore, the second storage system needs to determine when the execution start time of the oldest pending storage operation, associated with the selected storage operation category, exceeds the border execution time. This may be done by periodically or constantly monitoring the counters of all the compute entities-which are stored in a shared storage space, or by periodically requesting all the compute entities to report the execution start time of their oldest pending storage operation, in conjunction with the selected storage operation category. The minimum execution time associated with any counter among all the counters (that counts n storage operations, wherein n>0) of all the compute entities, associated with the storage operation category—is the time of the oldest pending storage operation, and if it exceeds the border execution time, it means that no more storage operations of the selected storage operation category—are pending anymore, including the non-responded access request.

(iv) When the border execution time is exceeded by the oldest pending operation of the selected storage operation category—the notification 263 is sent to the first storage system.

According to an embodiment, a content change request (CCRs) is selected out of a write operation, read-modify-write operation, metadata amendments (such as request for changing metadata related to an information unit stored or to be stored in the second storage system)—for example file rename, file creation, file deletion, and the like.

Figure 3:
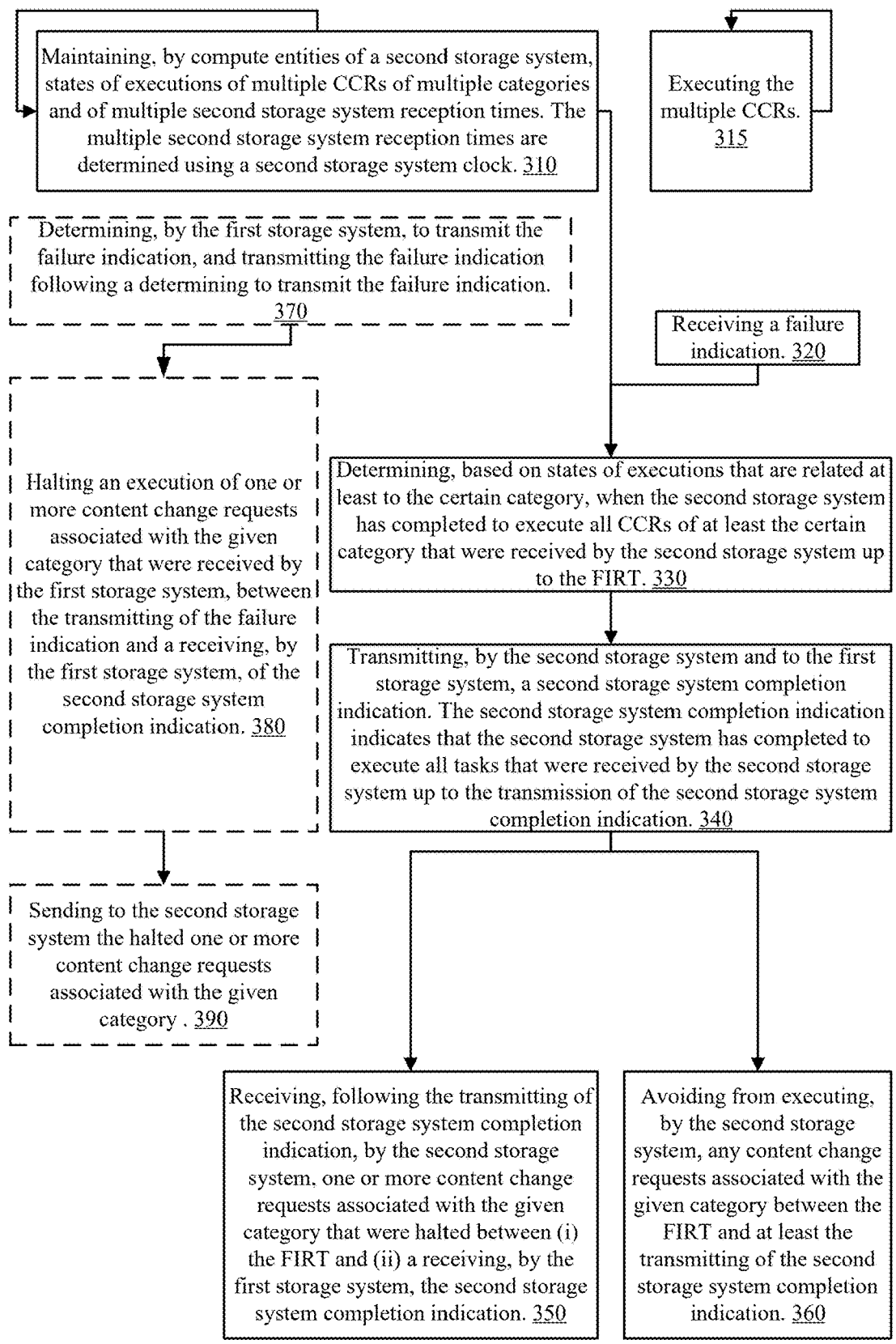
FIG. 3 is an example of a method.

FIG. 3 illustrates an example of method 300 for managing a lost content change request.

According to an embodiment, method 300 includes step 310 of maintaining, by compute entities of a second storage system, states of executions of multiple CCRs of multiple categories and of multiple second storage system reception times. The multiple second storage system reception times are determined using a second storage system clock (also referred to as the execution clock). For example—the values of the second storage system clock are accessible to the compute entities and its value is used as a timestamp, for stamping received CCRs, including CCRs received from the first storage system. The time stamp is an example of a second storage system reception time.

According to an embodiment, step 310 includes updating multiple counters (e.g., the counters of FIG. 1) that are associated with combinations of (i) the multiple categories and (ii) the multiple second storage system reception times, when receiving the CCRs and when completing an execution of the CCRs. Accordingly-a counter is associated with a pair of (category, second storage system reception time). The counters are for counting non-completed CCRs (either pending or during execution).

According to an embodiment, step 310, when applied by a compute entity and on a CCR, includes: (i) determining by the compute entity, a second storage system reception time associated with a reception of the CCR of a given category, (ii) increasing a given counter associated with a combination of (the certain category, the second storage system reception time associated with the reception of the CCR); and (iii) upon completion of the CCR, decreasing the given counter.

According to an embodiment, method 300 includes step 315 of executing the multiple CCRs, wherein the executing of the multiple CCRs comprises changing content stored in the second storage system. According to an embodiment, step 310 of maintaining the statuses occurs during the executing of step 315.

According to an embodiment, method 300 includes step 320 of receiving a failure indication.

According to an embodiment, the failure indication is (a) sent from a first storage system, (b) received by the second storage system at a failure indication reception time (FIRT, also referred to as "border execution time"), and (c) is indicative of a certain category of the multiple categories. The certain category is associated with a failure of the first storage system to receive a response, from the second storage system, to a certain CCR of the certain category, that was presumably sent from the first storage system to the second storage system.

According to an embodiment, the generation of the failure indication is triggered by the failure of the first storage system to receive the response, from the second storage system, to a certain CCR of the certain category, that was presumably sent from the first storage system to the second storage system.

According to an embodiment, the failure indication is indicative of the certain CCR.

According to an embodiment, the failure indication is not indicative of the certain CCR—but rather be indicative of the certain category to which the CCR belongs. The failure indication may be regarded as a request (aimed to the second storage system) to notify the first storage system, upon completing CCRs that started up to the time of receiving the failure indication.

According to an embodiment, steps 310 and 320 are followed by step 330 of determining, based on states of executions that are related at least to the certain category, when the second storage system has completed to execute all CCRs of at least the certain category that were received by the second storage system up to the FIRT.

According to an embodiment, step 330 is followed by step 340 of transmitting, by the second storage system to the first storage system, a second storage system completion indication. The second storage system completion indication indicates that the second storage system has completed executing all CCRs of at least the certain category that were received by the second storage system up to the FIRT.

According to an embodiment, the first storage system knows that it will not receive a response to the certain CCR after the reception of the second storage system completion indication—as the certain CCR should have been completed up to the transmission of the second storage system completion indication, or will be never executed.

According to an embodiment, step 340 is followed by step 350 of receiving, following the transmitting of the second storage system completion indication, by the second storage system, one or more content change requests associated with the given category that were halted between (i) the FIRT and (ii) a receiving, by the first storage system, the second storage system completion indication. The one or more content change requests may have been temporarily halted by the first storage system when the first storage system determines that it is not known whether a response to the one or more CCRs will be received, i.e., when a timeout occurs, or upon a failure of a compute entity of the first storage system that handled the one or more CCRs, or upon a failure of the communication with the user, or any failure related to the path of the one or more CCRs. Alternatively, the second storage system may halt (temporarily or permanently) the one or more CCRs that were received from the first storage system after the failure indication.

According to an embodiment, step 340 is followed by step 360 of avoiding from executing, by the second storage system, any content change requests associated with the given category between the FIRT and at least the transmitting of the second storage system completion indication. The avoiding may include halting—as described above.

Steps 310, 320, 330, 340, 350 and 360 are executed by the second storage system.

According to an embodiment, method 300 also includes various steps executable by the first storage system.

According to an embodiment, these steps include step 370 of determining, by the first storage system, to transmit the failure indication, and transmitting the failure indication following a determining to transmit the failure indication. The determination is done when it is not known whether a response to the certain CCR will be received, i.e., when a timeout occurs while waiting for response to the CCR, or upon any known failure related to the path of the certain CCR (network problem, compute node failure, etc.).

According to an embodiment, step 370 includes determining to transmit the failure indication following a passage of a timeout period from a presumed sending of the certain CCR from the first storage system to the second storage system.

According to an embodiment, these steps also include step 380 of halting an execution of one or more content change requests associated with the given category that were received by the first storage system, between the transmitting of the failure indication and a receiving, by the first storage system, of the second storage system completion indication. According to an embodiment, the first storage system resumes handling the one or more CCEs that were halted, after receiving the second storage system completion indication.

Figure 4:
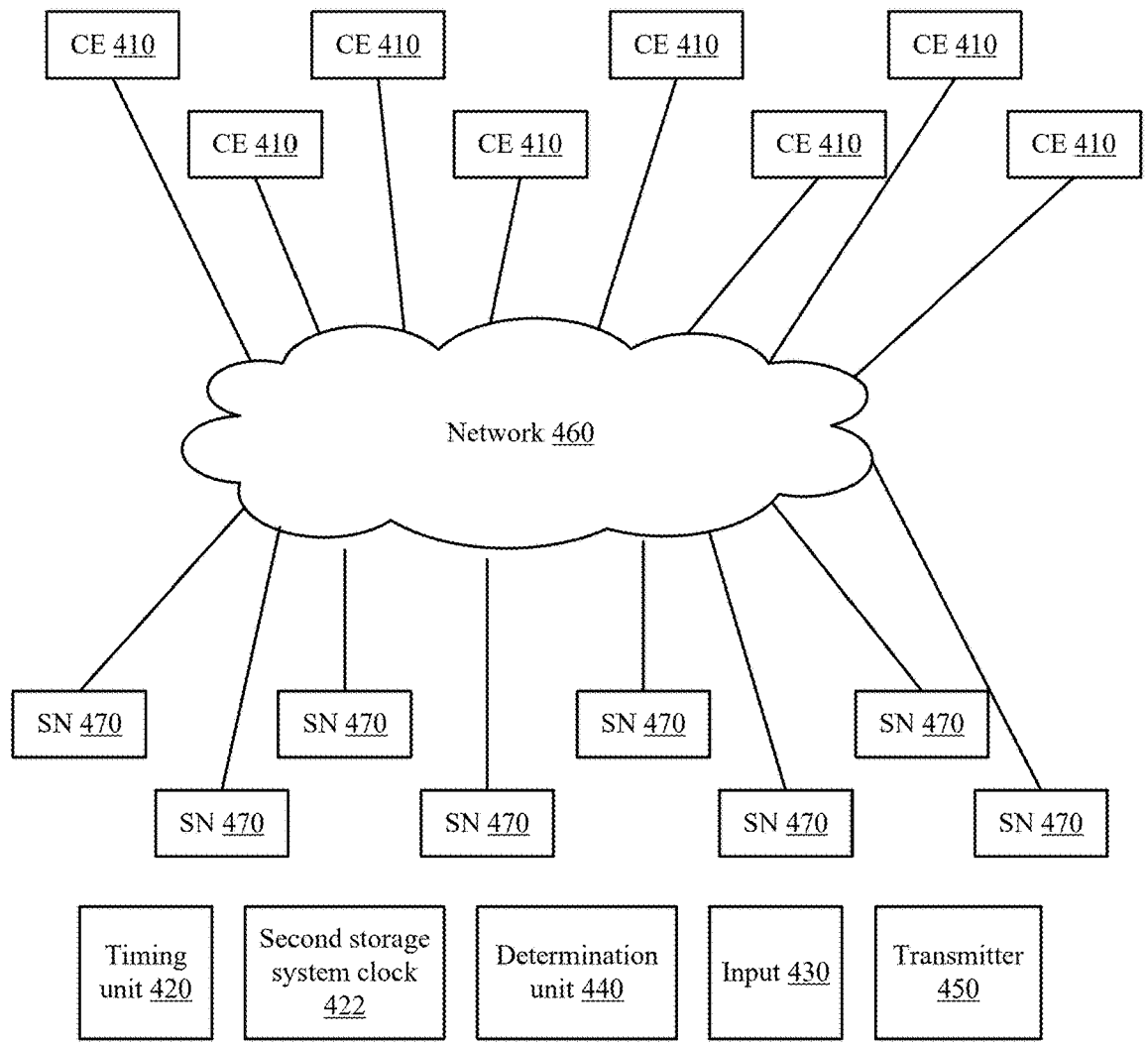
FIG. 4 is an example of a storage system.

FIG. 4 illustrates an example of second storage system 400.

Second storage system 400 has capabilities for managing lost content change request.

According to an embodiment, the second storage system 400 includes compute entities 410, timing unit 420, second storage system clock 422, input 430, determination unit 440 and transmitter 450.

According to an embodiment, the compute entities are arranged as multiple compute nodes that are in communication, via network 460 with multiple storage nodes 470.

According to an embodiment, the compute entities are configured to maintain states of executions of multiple content change requests (CCRs) of multiple categories and of multiple second storage system reception times.

According to an embodiment, the compute entities are also configured to execute the multiple CCRs.

Each of the compute entities includes at least one processing circuitry that may include a central processing unit (CPU), and/or one or more other integrated circuits such as application-specific integrated circuits (ASICs), field programmable gate arrays (FPGAs), full-custom integrated circuits, etc., or a combination of such integrated circuits.

According to an embodiment, there is at least one compute entity that executes a CCR without maintaining a status of the execution of the CCR.

According to an embodiment, there is at least one compute entity that does not execute a CCR but maintains a status of the execution of the CCR.

According to an embodiment, there is at least one compute entity that executes a CCR and also maintains a status of the execution of the CCR.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for managing a lost content change request, the method comprises:
   maintaining, by compute entities of a second storage system, states of execution of multiple content change requests (CCRs) of multiple categories and of multiple second storage system reception times; the multiple second storage system reception times are determined using a second storage system clock; wherein the compute entities comprise one or more integrated circuits;
   receiving, from a first storage system, by the second storage system, and at a failure indication reception time (FIRT), a failure indication that is indicative of a certain category of the multiple categories, the certain category is associated with a failure of the first storage system to receive a response, from the second storage system, to a certain CCR that was presumably sent from the first storage system to the second storage system and is of the certain category;
   executing, by the compute entities of the second storage system, content updates related to at least part of the multiple CCRs, and modifying, in response to executing one or more content updates, an oldest CCR time, that is associated with non-executed CCRs of the certain category; wherein the executing occurs while an execution of one or more content change requests associated with the certain category is halted by the first storage system;
   determining, based on states of executions that are related at least to the certain category and the oldest CCR time, when the second storage system has completed to execute all CCRs of at least the certain category that were received by the second storage system up to the FIRT; and
   transmitting, by the second storage system and to the first storage system, a second storage system completion indication that indicates that the second storage system has completed to execute all the CCRs of at least the certain category that were received by the second storage system up to the FIRT.

2. The method according to claim 1, comprising receiving, following the transmitting of the second storage system completion indication, by the second storage system, one or more content change requests associated with the certain category that were halted between (i) the FIRT and (ii) a receiving, by the first storage system, the second storage system completion indication.

3. The method according to claim 1, wherein the maintaining of the states comprises updating multiple counters that are associated with combinations of (i) the multiple categories and (ii) the multiple second storage system reception times, when receiving the multiple CCRs and when completing an execution of the multiple CCRs.

4. The method according to claim 3, wherein the updating of the multiple counters comprises:
   a. determining by a compute entity of the compute entities, a second storage system reception time associated with a reception of a CCR of a given category;
   b. increasing a given counter associated with a combination of (i) the given category, and (ii) the second storage system reception time associated with the reception of the CCR; and
   c. upon completion of the CCR, decreasing the given counter.

5. The method according to claim 1, further comprising determining, by the first storage system, to transmit the failure indication, and transmitting the failure indication following a determining to transmit the failure indication.

6. The method according to claim 5, further comprising halting the execution of the one or more content change requests associated with the certain category that were received by the first storage system, between the transmitting of the failure indication and a receiving, by the first storage system, of the second storage system completion indication.

7. The method according to claim 5, comprising determining to transmit the failure indication following a passage of a timeout period from a presumed sending of the certain CCR from the first storage system to the second storage system.

8. The method according to claim 1, comprising executing the multiple CCRs, wherein the executing of the multiple CCRs comprises changing content stored in the second storage system.

9. The method according to claim 1 wherein the multiple CCRs comprise at least one write request.

10. The method according to claim 1 wherein the multiple CCRs comprise at least one request for changing metadata related to an information unit.

11. A second storage system having capabilities for managing lost content change request, the second storage system comprises:
   compute entities that are configured to: (i) maintain states of executions of multiple content change requests (CCRs) of multiple categories and of multiple second storage system reception times; and (ii) execute content updates related to at least part of the multiple CCRs, and modifying, in response to executing one or more content updates, an oldest CCR time, that is associated with non-executed CCRs of each category; wherein the executing occurs while an execution of one or more content change requests associated with the certain category is halted by the first storage system;
   wherein the compute entities comprise one or more integrated circuits;
   a timing unit that is configured to determine the multiple second storage system reception times using a second storage system clock;
   an input that is configured to receive, from a first storage system, by the second storage system, and at a failure indication reception time (FIRT), a failure indication that is indicative of a certain category of the multiple categories, the certain category is associated with a failure of the first storage system to receive a response, from the second storage system, to a certain CCR that was presumably sent from the first storage system to the second storage system and is of the certain category;
   a determination unit that is configured to determine, based on states of executions that are related at least to the certain category—and an oldest CCR time associated with non-executed CCRs of the certain category, when the second storage system has completed to execute all CCRs of at least the certain category that were received by the second storage system up to the FIRT;
   a transmitter that is configured to transmit the first storage system, a second storage system completion indication that indicates that the second storage system has completed to execute all the CCRs of at least the certain category that were received by the second storage system up to the FIRT.

12. A non-transitory computer readable medium that stores instructions for managing lost content change request, the non-transitory computer readable medium stores instructions for:
   maintaining, by compute entities of a second storage system, states of executions of multiple content change requests (CCRs) of multiple categories and of multiple second storage system reception times; the multiple second storage system reception times are determined using a second storage system clock; wherein the compute entities comprise one or more integrated circuits;
   receiving, from a first storage system, by the second storage system, and at a failure indication reception time (FIRT), a failure indication that is indicative of a certain category of the multiple categories, the certain category is associated with a failure of the first storage system to receive a response, from the second storage system, to a certain CCR that was presumably sent from the first storage system to the second storage system and is of the certain category;
   executing, by the compute entities of the second storage system, content updates related to at least part of the multiple CCRs, and modifying, in response to executing one or more content updates, an oldest CCR time, that is associated with non-executed CCRs of the certain category; wherein the executing occurs while an execution of one or more content change requests associated with the certain category is halted by the first storage system;
   determining, based on states of executions that are related at least to the certain category and the oldest CCR time, when the second storage system has completed to execute all CCRs of at least the certain category that were received by the second storage system up to the FIRT;
   transmitting, by the second storage system and to the first storage system a second storage system completion indication that indicates that the second storage system has completed to execute all the CCRs of at least the certain category that were received by the second storage system up to the FIRT.

13. The non-transitory computer readable medium according to claim 12, that stores instructions for receiving, following the transmitting of the second storage system completion indication, by the second storage system, one or more content change requests associated with the certain category that were halted between (i) the FIRT and (ii) a receiving, by the first storage system, the second storage system completion indication.

14. The non-transitory computer readable medium according to claim 13, wherein the updating of the multiple counters comprises:
   a. determining by a compute entity of the compute entities, a second storage system reception time associated with a reception of a CCR of a given category,
   b. increasing a given counter associated with a combination of (i) the given category, and (ii) the second storage system reception time associated with the reception of the CCR; and
   c. upon completion of the CCR, decreasing the given counter.

15. The non-transitory computer readable medium according to claim 12, wherein the maintaining of the states comprises updating multiple counters that are associated with combinations of (i) the multiple categories and (ii) the multiple second storage system reception times, when receiving the multiple CCRs and when completing an execution of the multiple CCRs.

16. The non-transitory computer readable medium according to claim 12, that stores instructions for executing the multiple CCRs, wherein the executing of the multiple CCRs comprises changing content stored in the second storage system.

17. The non-transitory computer readable medium according to claim 12, wherein the CCRs comprise at least one write request.

18. The non-transitory computer readable medium according to claim 12, wherein the CCRs comprise at least one request for changing metadata related to an information unit.

\* \* \* \* \*